US012241767B2

(12) United States Patent
Kazemzadeh et al.

(10) Patent No.: US 12,241,767 B2
(45) Date of Patent: *Mar. 4, 2025

(54) DOSING APPLICATOR FOR MEDICAL AND NON-MEDICAL CONTAINERS

(71) Applicant: FLEXPENSER AB, Stockholm (SE)

(72) Inventors: Amin Kazemzadeh, Stockholm (SE); Esmail Pishbin, Tehran (IR); Giulia Gaudenzi, Stockholm (SE); Robert Bouwens, Grapevine, TX (US)

(73) Assignee: FLEXPENSER AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,654

(22) Filed: Jan. 26, 2024

(65) Prior Publication Data
US 2024/0159580 A1 May 16, 2024

Related U.S. Application Data

(63) Continuation of application No. 17/659,287, filed on Apr. 14, 2022, now Pat. No. 11,885,660.
(Continued)

(51) Int. Cl.
*G01F 11/08* (2006.01)
*A61J 1/20* (2006.01)

(52) U.S. Cl.
CPC ........... *G01F 11/082* (2013.01); *A61J 1/2037* (2015.05)

(58) Field of Classification Search
CPC ................ G01F 11/082; G01F 11/084; B01L 2400/0638; B01L 2400/0481;
(Continued)

(56) References Cited

U.S. PATENT DOCUMENTS 465,484 A * 12/1891 Magoris ............... B05B 11/062
222/633
2,804,240 A 8/1957 Anderson
(Continued)

FOREIGN PATENT DOCUMENTS

| EP | 0492354 B1 | 9/1994 |
| FR | 2380077 A1 | 9/1978 |
| WO | 2005/039998 A1 | 5/2005 |

OTHER PUBLICATIONS

International Search Report and Written Opinion of the International Searching Authority dated Sep. 9, 2022, in connection with International Application No. PCT/US22/71727, 10 pages.
(Continued)

*Primary Examiner* — Paul R Durand
*Assistant Examiner* — Randall A Gruby

(57) ABSTRACT

A container configured for housing a fluid. A compressible body disposed within the container for dispensing fluid. The compressible body is compressed by applying compression to the container. When the compressible body changes from a non-compressed state to a compressed state, the fluid within the container does not flow into compressible body and fluid within the compressible body flows out of the compressible body and when the compressible body changes from the compressed state to the non-compressed state the fluid flows into the compressible body.

14 Claims, 12 Drawing Sheets

Related U.S. Application Data

(60) Provisional application No. 63/201,245, filed on Apr. 20, 2021.

(58) Field of Classification Search
CPC ........ B01L 3/0272; F16K 21/00; F04B 43/08; B29C 33/38; B29C 33/40
See application file for complete search history.

(56) References Cited

U.S. PATENT DOCUMENTS

| | | | |
|---|---|---|---|
| 3,125,250 A | | 3/1964 | Ballin |
| 3,146,919 A | | 9/1964 | Chappell |
| 3,567,079 A | | 3/1971 | Weigand |
| 4,017,008 A | * | 4/1977 | Raitport ................ B05B 11/048 222/94 |
| 4,518,105 A | | 5/1985 | Kuckens et al. |
| 4,573,613 A | | 3/1986 | de Freitas |
| 4,728,011 A | | 3/1988 | Schuster et al. |
| 4,811,871 A | | 3/1989 | Wass et al. |
| 4,946,080 A | | 8/1990 | Vesborg |
| 5,014,881 A | | 5/1991 | Andris |
| 5,462,208 A | | 10/1995 | Stahley et al. |
| 5,497,910 A | * | 3/1996 | Meadows .......... B65D 83/0055 222/494 |
| 5,505,341 A | | 4/1996 | Gueret |
| 5,544,789 A | | 8/1996 | Gillingham |
| 5,664,703 A | * | 9/1997 | Reifenberger ...... B05B 11/1067 222/207 |
| 6,343,716 B1 | | 2/2002 | Baudin et al. |
| 6,406,207 B1 | | 6/2002 | Wiegner et al. |
| 6,547,106 B2 | | 4/2003 | Bonningue |
| 6,805,267 B2 | | 10/2004 | Bougamont |
| 8,596,501 B2 | | 12/2013 | Hagleitner |
| 8,783,520 B2 | | 7/2014 | Hagleitner |
| 8,997,788 B2 | | 4/2015 | Wozna |
| 9,433,960 B2 | | 9/2016 | Law et al. |
| 9,650,187 B2 | | 5/2017 | Weibel |
| 10,071,836 B2 | | 9/2018 | Holroyd et al. |
| 10,488,240 B2 | | 11/2019 | Hoefte |
| 10,773,864 B2 | | 9/2020 | Harman et al. |
| 11,471,902 B2 | | 10/2022 | Byun |
| 11,760,557 B2 | * | 9/2023 | Hirko .................... B05B 11/061 222/1 |
| 2005/0029285 A1 | | 2/2005 | Gay, III et al. |
| 2005/0051579 A1 | | 3/2005 | Kasting |
| 2012/0097714 A1 | | 4/2012 | Hoefte et al. |
| 2013/0270301 A1 | | 10/2013 | Schoubben et al. |
| 2017/0336234 A1 | | 11/2017 | Pater et al. |
| 2019/0039807 A1 | | 2/2019 | De Cleir |
| 2021/0394214 A1 | | 12/2021 | Byun |

OTHER PUBLICATIONS

Supplementary European Search Report dated Oct. 18, 2024, in connection with European Patent Application No. 229799766.5, 8 pages.

* cited by examiner

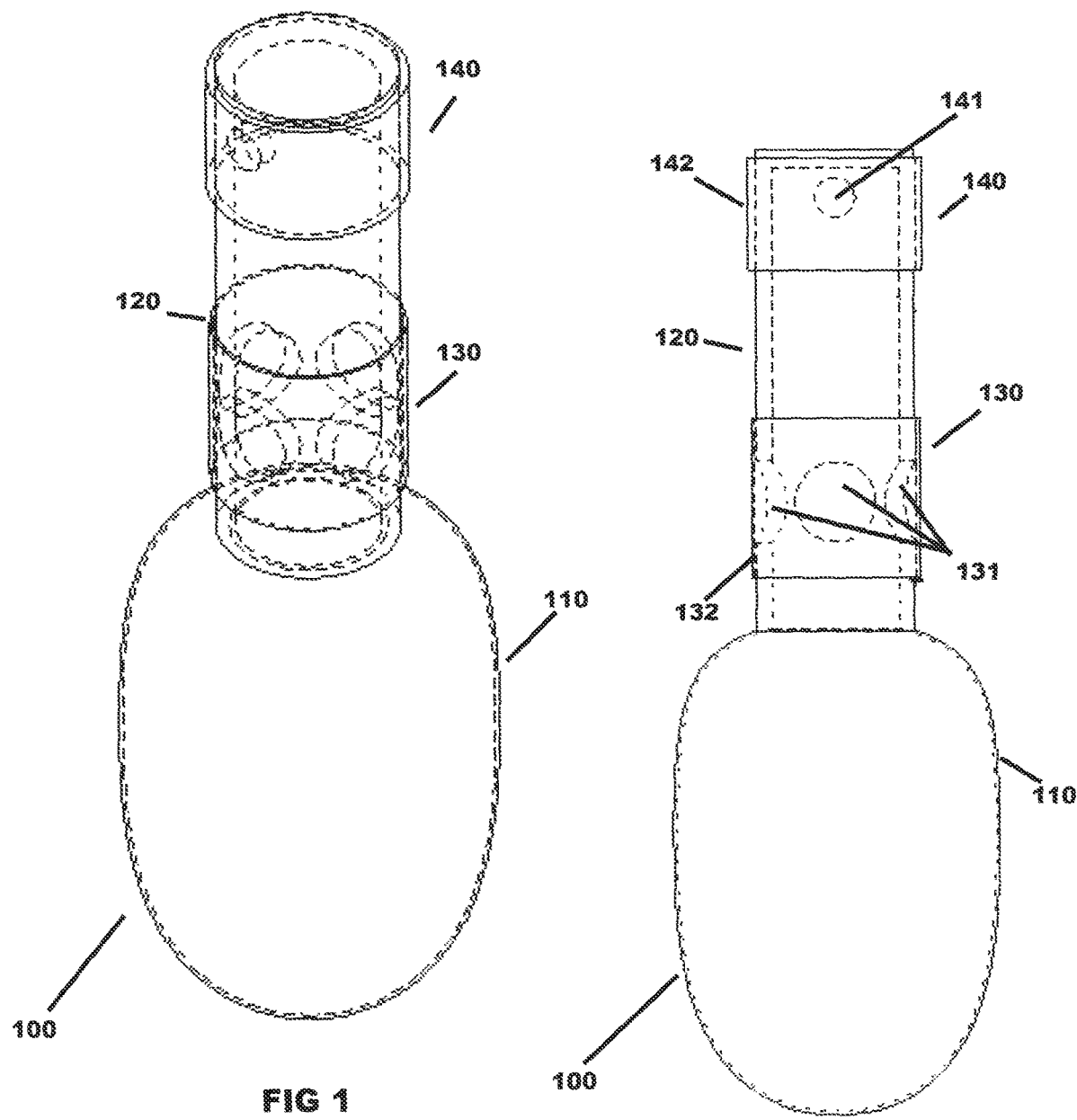

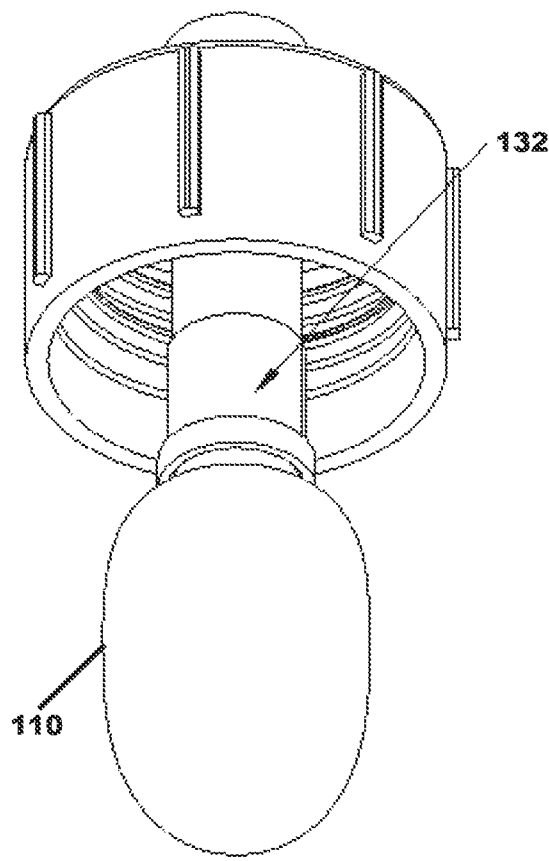
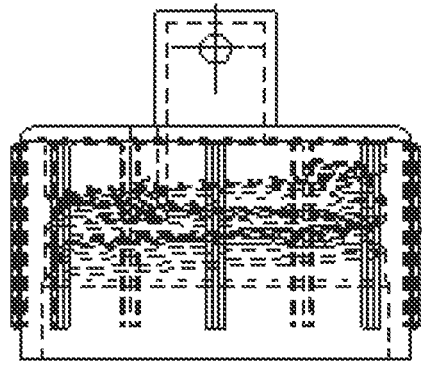
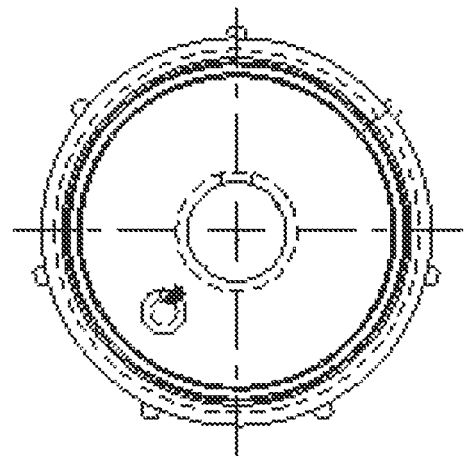
FIG 5
FIG 6

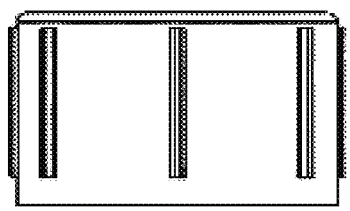
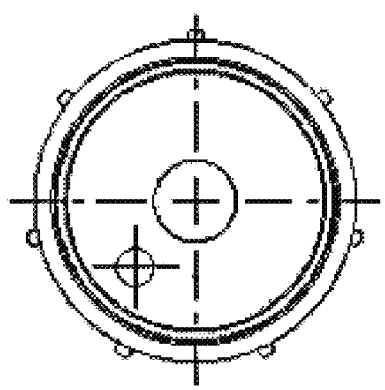
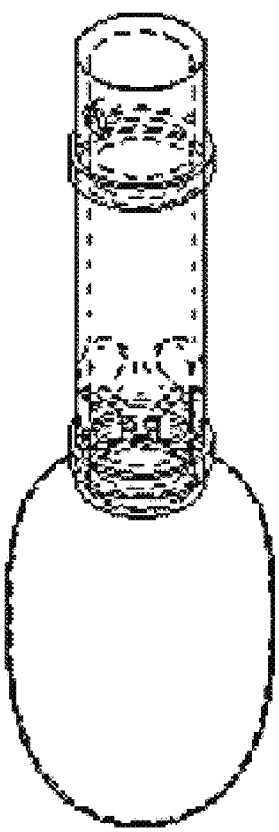
FIG 11   FIG 12

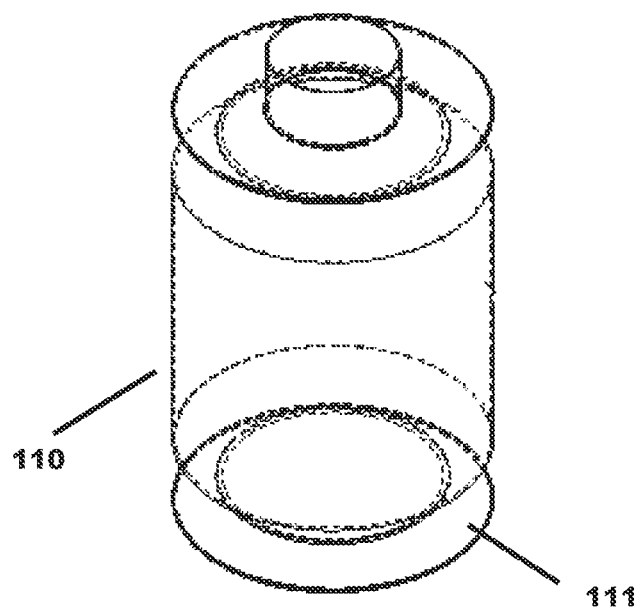
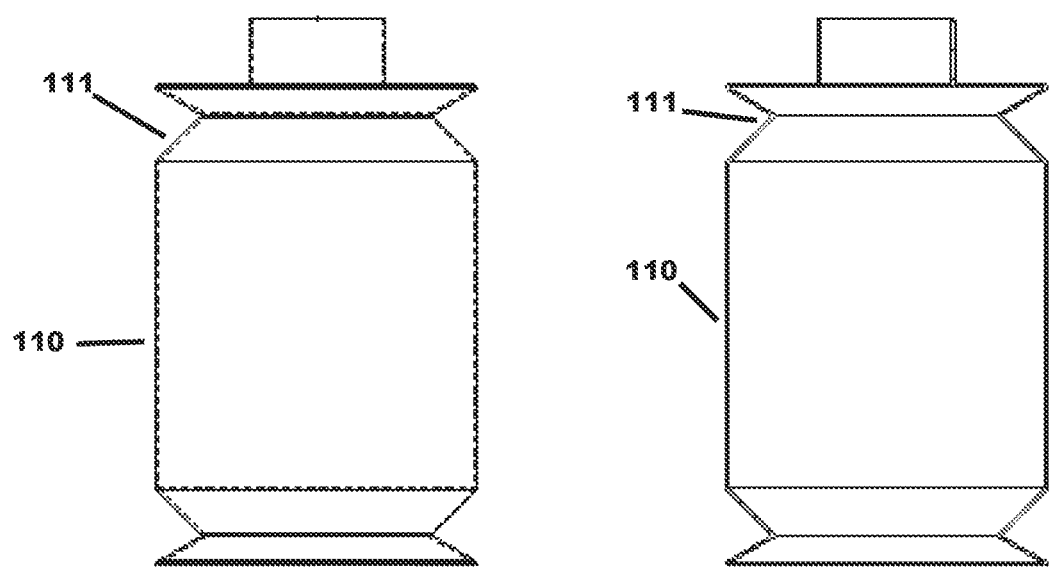
FIG 14

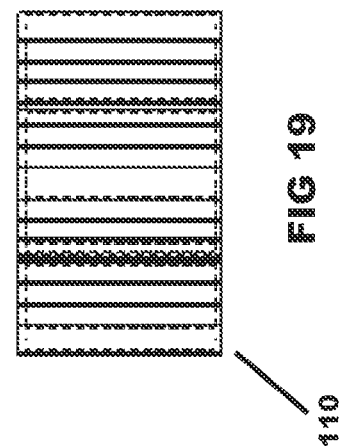
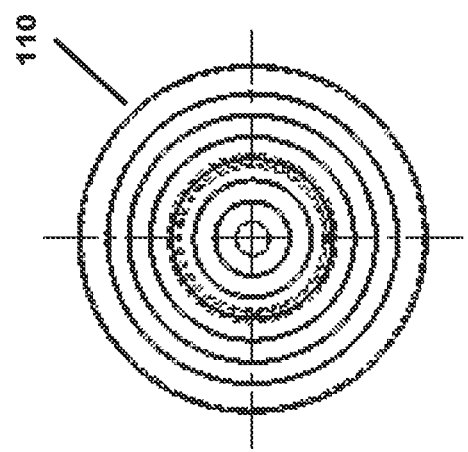
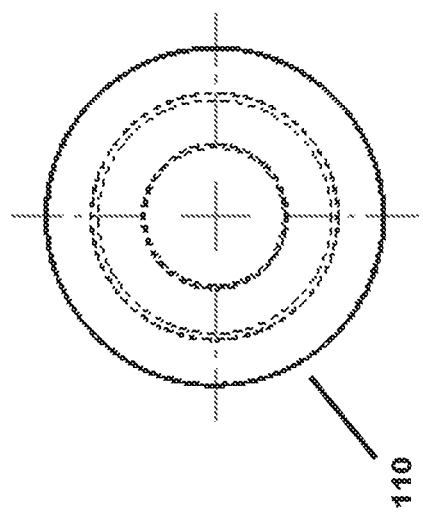

DOSING APPLICATOR FOR MEDICAL AND NON-MEDICAL CONTAINERS

CITATION TO PRIOR APPLICATIONS

The present application is a continuation of U.S. Application No. 17/659,287, titled "Dosing Applicator for Medical and Non-Medical Containers" filed Apr. 14, 2022, now U.S. Pat. No. 11,885,660 which claims priority to U.S. Provisional Application No. 63/201,245, titled "Dosing Applicator for Medical and Non-Medical Containers" and filed Apr. 20, 2021.

FIELD OF THE DISCLOSURE

This subject matter disclosed here is directed to dispenser element configured for engagement with fluid containers and which are suitable for dispensing exact and regular doses of a liquid. The subject matter disclosed further is directed to containers having such a dispenser element.

BACKGROUND

One way that producers of liquids have chosen to present their products is to provide them in containers that can be squeezed by an operator for dispensing the content. These containers have either simple or valve-controlled spouts, to enable user-friendly dispensing of their contents. Research in 2017 indicated that more than 700 million tons of liquids are wasted every year. Much of these liquids often pollute our surface and ground water. This environmental threat and the relative costs of liquid products have created a desire to prevent liquids waste. An effective approach to reducing liquid waste is providing the ability to only use the required amount of product for the task. The dispensing action in conventional containers are pressure dependent, that makes them almost impossible to dispense exact amount of liquid for all users. To date, several methods have been introduced that enable conventional flexible containers to provide exact dosing, e.g., WO201 3158732 (the entirety of this disclosure is hereby incorporated by reference). These types of systems constitute several stationary and moving parts and are usually limited to a range of dispensed volume per actuation. In principle these systems have a dosing chamber, a piston, inlets and fitting parts. The liquid will be first directed to a dosing chamber and from there an exact amount of liquid will be dispensed through a valve. Recently, single dose chamber systems have been introduced to improve the previous designs and eliminate some of their drawbacks, e.g., WO2017093707A1 and WO2013158732 (the entirety of these disclosures are hereby incorporated by reference). These systems constitute a floating plunger and a set of openings that allow liquid to enter the dosing chamber and a small hole that allows liquid to push the floating piston when the user squeeze the container.

These systems generally, have significant limitations. First, they are limited in the amount of liquid that they can measure and dispense. As such, their application is limited to specific industries. Secondly, they are not highly accurate to meet the requirements of different industries e.g., pharmaceuticals, diagnostics. The current subject matter discloses a mechanism that does not have such limitations and can be used in different industries e.g., homecare, hygienic, pharmaceutical, medical devices, laboratory, diagnostic, etc.

SUMMARY

WO2017161259A1 (the entirety of the disclosure is hereby incorporated by reference) disclosed a pressure-operated technique that is self-resealing and air-tight. The disclosure described a specially-configured container having a volume of fluid therein. According to that disclosure, the container comprises one or more holes through which fluid may be communicated from the container's interior volume to outside of the container. These holes, however, were not designed or specifically configured to allow any external matter to enter into the container. In other words, the disclosure described a substantially stand-alone device not designed to be self-refilling.

The disclosure further described a release of liquids proportional to a user's pressure acted upon the container. The disclosed design could be applied to any form of container. Generally, the disclosure set out a container comprising a reservoir with at least one hole covered with an elastic membrane. Upon pressure, the membrane is configured to stretch thereby dispensing fluid from within the container. When the pressure is released, the membrane reseals the hole. In the absence of pressure, the membrane remains in a close state. However, this system is pressure dependent, and is not configured (nor is it able) to aspirate fluid, which renders it ineffective for use in dispensing exact amounts of liquid when it is squeezed manually.

In the present disclosure, a unique solution is described through a dispenser element that enables accurate dosing of liquid contents of different viscosities. The dispenser element can be used in flexible containers, containers located inside another device e.g., washing machines, dish washers, diagnostic and laboratory devices machines or manually for detergent containers.

BRIEF DESCRIPTION OF THE DRAWINGS

FIG. 1 depicts a perspective view of a dosing device in accordance with various embodiments of the present disclosure.

FIG. 2 depicts a sectional view of a dosing device in accordance with various embodiments of the present disclosure.

FIG. 5 depicts a perspective view of a dosing device incorporated into a cap m accordance with various embodiments of the present disclosure.

FIG. 6 depicts a side and top view of a cap and optional airhole in accordance with various embodiments of the present disclosure.

FIG. 11 depicts a side and top view of a cap and optional airhole in accordance with various embodiments of the present disclosure.

FIG. 12 depicts a perspective view of a dosing device without membranes in accordance with various embodiments of the present disclosure.

FIG. 14 depicts a flexible bulb in accordance with various embodiments of the present disclosure.

FIG. 15 depicts a top view of a flexible bulb in accordance with various embodiments of the present disclosure.

FIG. 17 depicts a top view of a flexible bulb in accordance with various embodiments of the present disclosure.

FIG. 19 depicts a top view of a flexible bulb in accordance with various embodiments of the present disclosure.

DETAILED DESCRIPTION

This description, with references to the figures, presents non-limiting examples of embodiments of the present disclosure.

Figure 3:
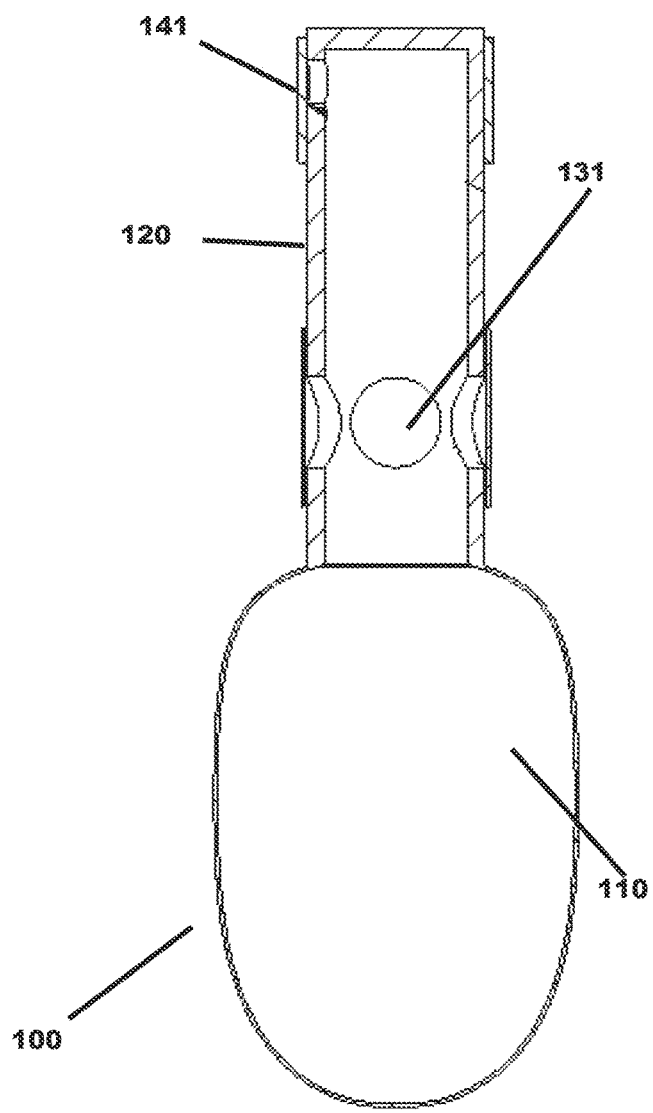
FIG. 3 depicts a side view of a dosing device in accordance with various embodiments of the present disclosure.
Figure 4:
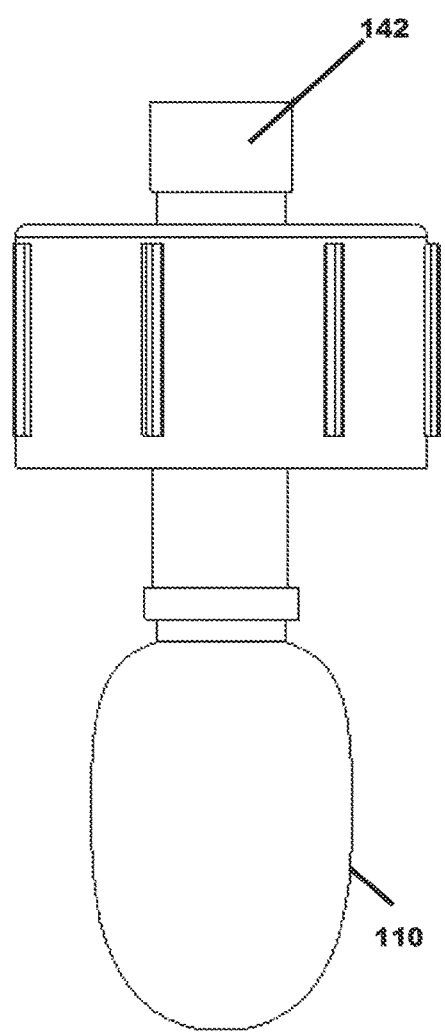
FIG. 4 depicts a side view of a dosing device incorporated into a cap in accordance with various embodiments of the present disclosure.
Figure 7:
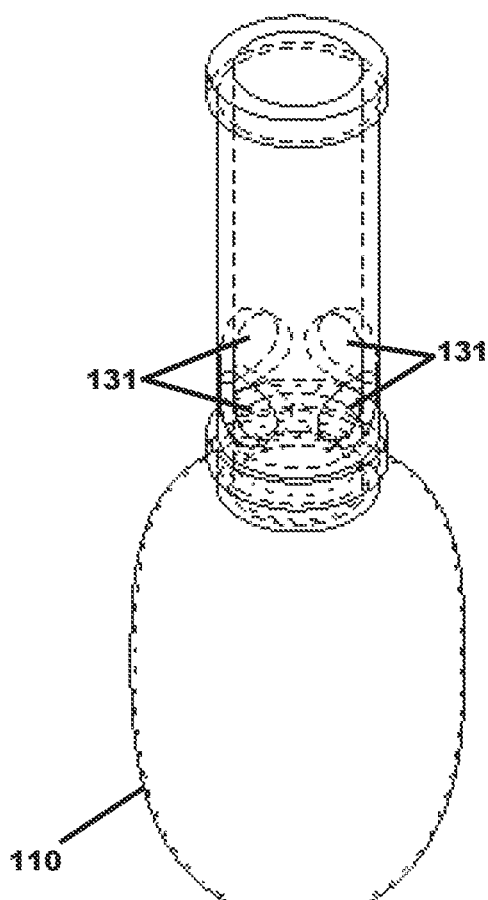
FIG. 7 depicts a perspective view of a dosing device without membranes in accordance with various embodiments of the present disclosure.
Figure 8:
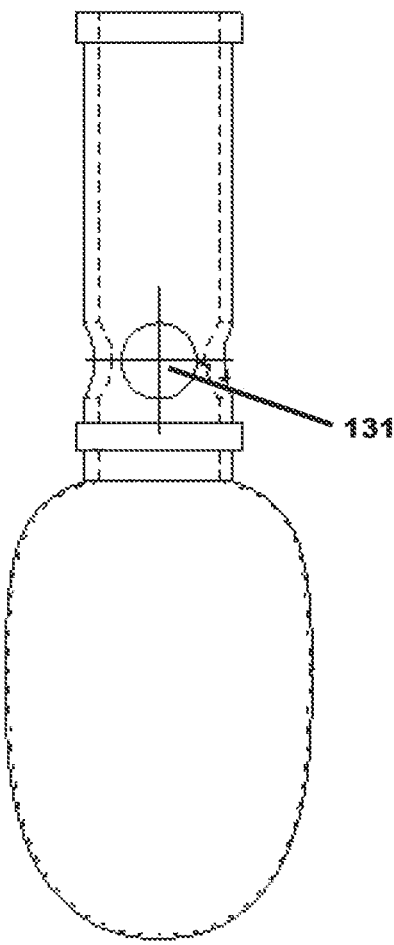
FIG. 8 depicts a side view of a dosing device with a stopper to retain a membrane in accordance with various embodiments of the present disclosure.
Figure 9:
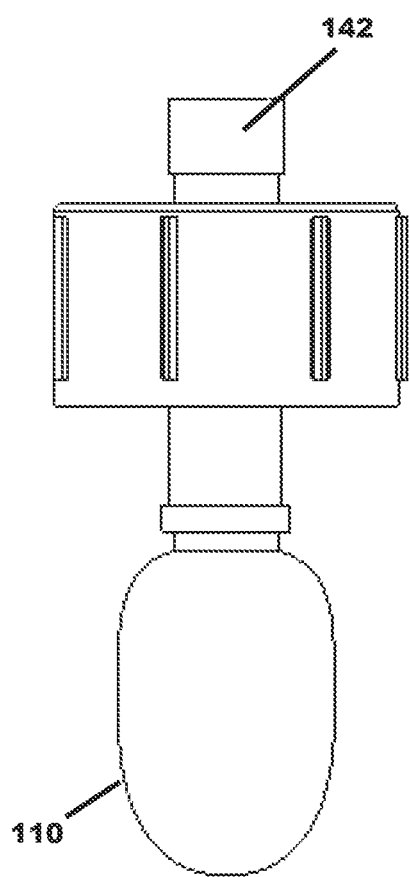
FIG. 9 depicts a side view of a dosing device incorporated into a cap in accordance with various embodiments of the present disclosure.
Figure 10:
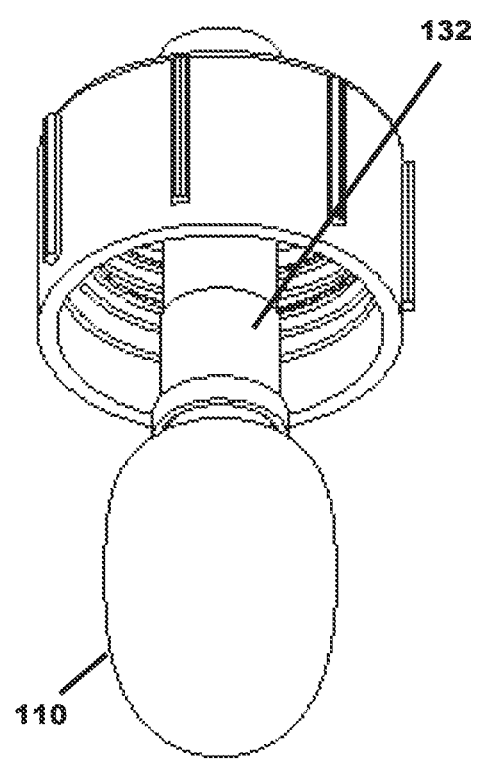
FIG. 10 depicts a perspective view of a dosing device incorporated into a cap in accordance with various embodiments of the present disclosure.
Figure 13:
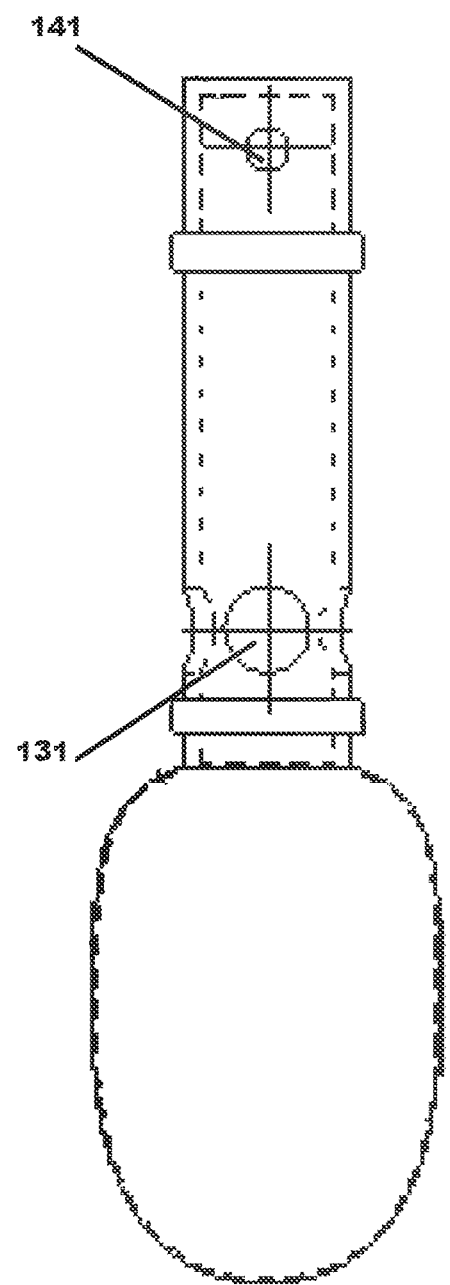
FIG. 13 depicts a side view of a dosing device with a holder to retain a membrane in accordance with various embodiments of the present disclosure.
Figure 16:
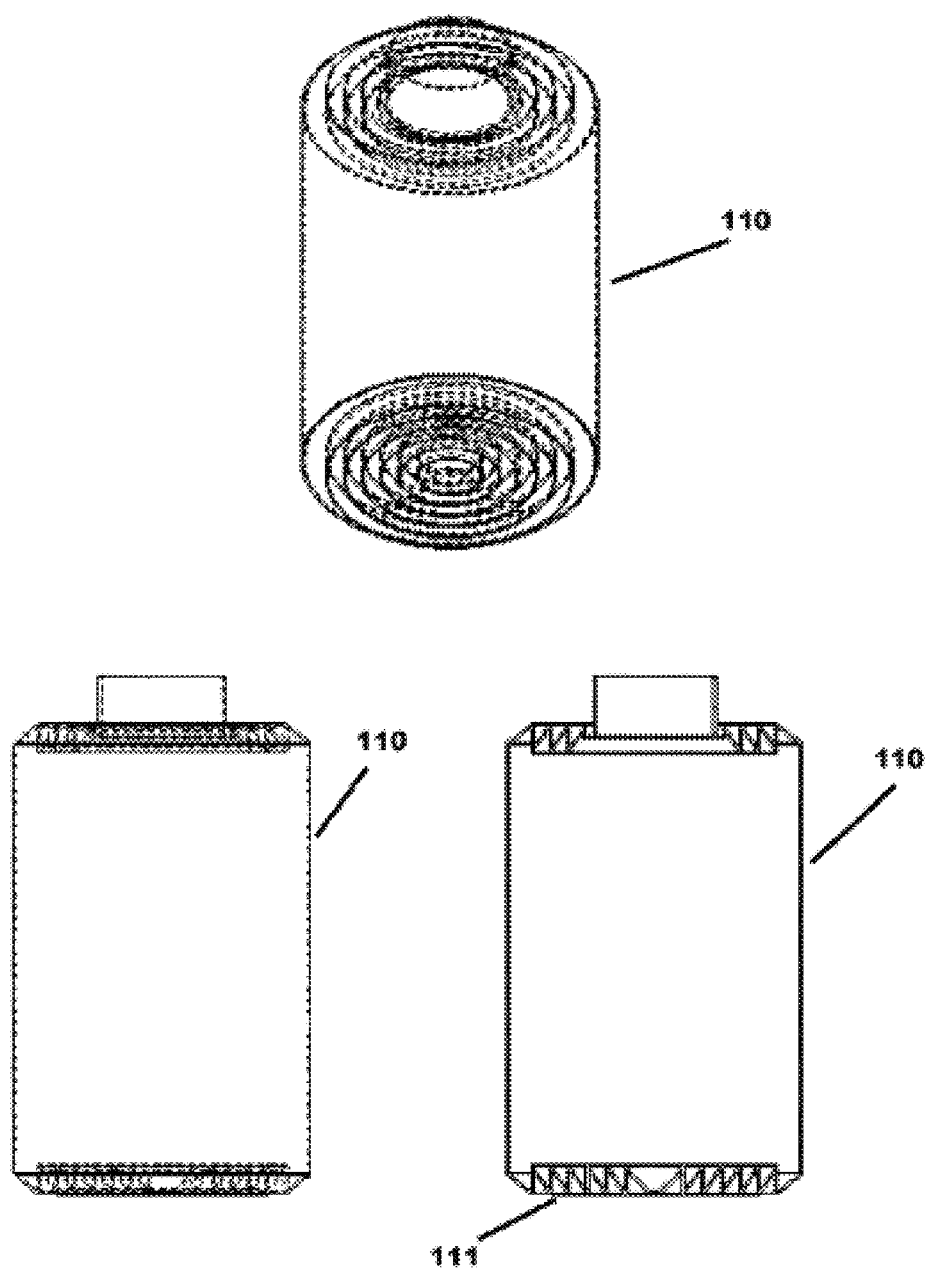
FIG. 16 depicts a flexible bulb in accordance with various embodiments of the present disclosure.
Figure 18:
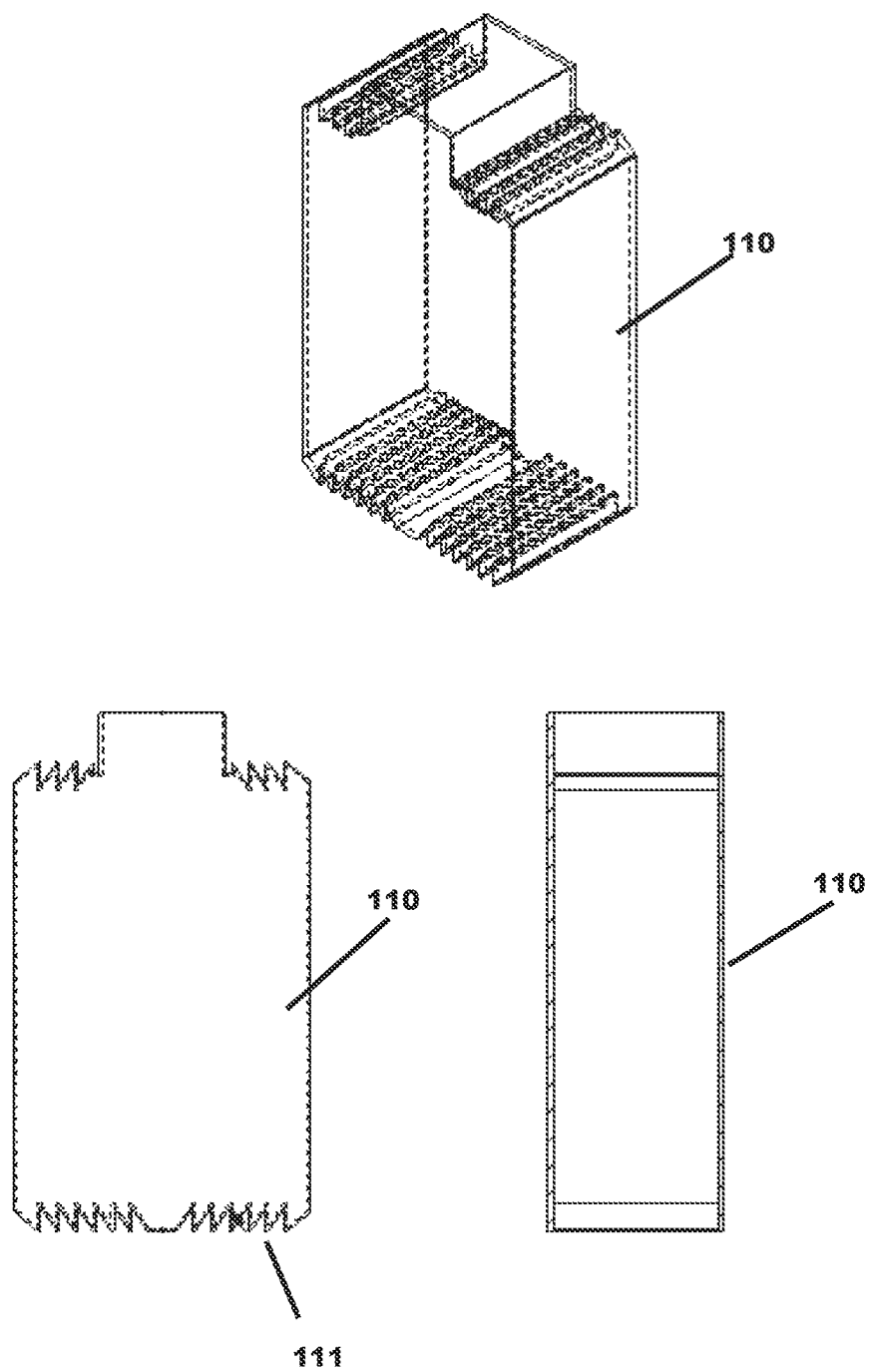
FIG. 18 depicts a flexible bulb in accordance with various embodiments of the present disclosure.

The disclosed dispenser element is designed to be assembled and disposed within flexible and resilient containers e.g., plastic bottles to provide exact dosing. The dispenser element may be interfaced with, or otherwise engaged to, a container in various ways, optionally using conventional techniques. For example, as seen in FIGS. 4 and 5, it can be fully integrated with a cap and mounted on the container. In another instance, seen in FIGS. 9 and 10, parts of the dispenser element can be integrated with the cap and other part of it can be assembled with, or integral to, the container.

In certain embodiments, such as those seen in FIGS. 1-5, 7-10, 12, and 13, a dispenser assembly comprises a flexible bulb 110 connected to a tube 120 and two or more one-way valves i.e., $FV_{in}$'s and $FV_{ex}$'s. $FV_{ex}$ 140 comprises at least one aperture 141 that is tightly covered with an elastic membrane 142. $FV_{in}$ 130 comprises at least one aperture or a group of apertures, 131 which are surrounded by an elastic membrane 132. The thickness of the membrane 132 covering $FV_{in}$ 130 is optionally thin enough to make it easily deformed by applying pressure to close the opening. The size of the apertures of $FV_{in}$ 130 and the size of the membrane 132 covering these apertures assist in defining the successful operation of the valves and may be varied, in manners that would be well within the understanding of those having ordinary skill in the art, for different viscosities and different applications. Also, the suitable tightness of the membrane 142 of $FV_{ex}$ 140 in relation with the looseness of the membrane 132 of $FV_{in}$ 130 will influence the operation of disclosed device and may be adjusted as needed. For instance, for exact dispensing of water, smaller holes e.g., approximately 1-2.5 mm diameter and a thin membrane of approximately 0.1 to 0.8 mm wall thickness and of a 5-12 mm length will provide exact dosing for a 330 ml bottle that is resilient and flexible.

Generally, the membranes of all valves have to be elastic or flexible enough to be able to open and close at squeezing pressure, e.g., latex, silicon, natural and synthetic rubber, etc. The difference between $FV_{ex}$'s and $FV_{in}$'s is that $FV_{ex}$'s are initially closed and open when pressure is applied while $FV_{in}$'s are initially open and close when the pressure is applied. $FV_{ex}$'s are located outside the container and act as a normally closed valve. $FV_{in}$'s are located inside the container and act as a normally open valve. After the dispenser element 100 is assembled and disposed within a container 200 that is flexible and resilient, the dispenser element 100 is capable of accurate dispensing of fluid. As depicted in the FIG. 20, the container 200 may be arranged such that the dispenser element 100 is substantially pointing downward thereby causing any fluid within the container 200 to come into contact with the dispenser element 100. First, when the container 200 is pressured by the user, the $FV_{ex}$'s close, and the bulb deforms. Once the pressure is released, $FV_{ex}$'s open, and fluid within the container 200 is sucked into the dispenser device 100 as the bulb reverts back to its original shape. $FV_{ex}$ dosing system can be assembled with the container 200 to automatically meter and dispense the intended volume of the liquid when the container is squeezed.

In some embodiments, an elastic membrane, 132 or 142, may be made of a material such as VLDPE, ULDPE and TPE.

Figure 20:
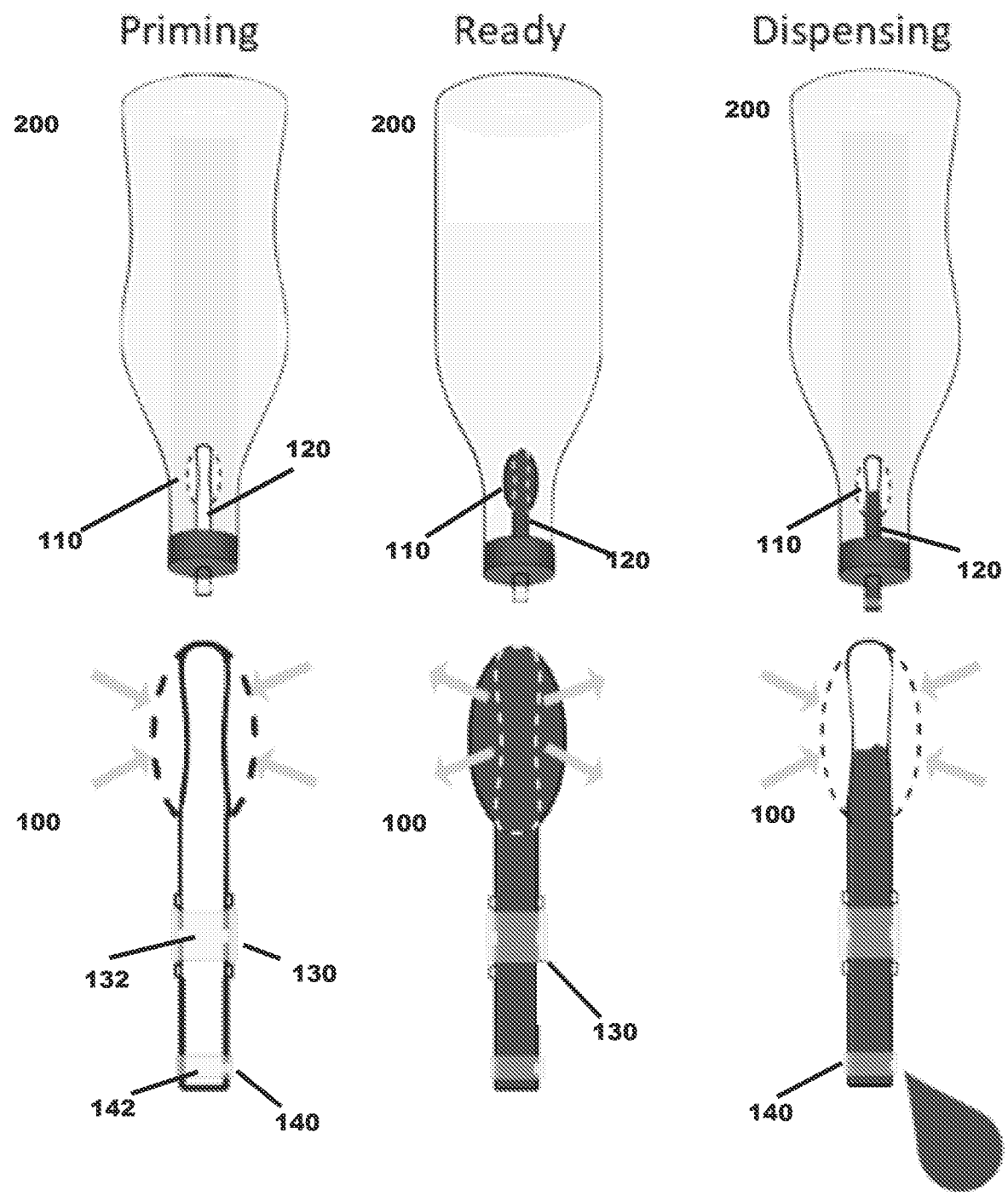
FIG. 20 depicts use of a dosing device in accordance with various embodiments of the present disclosure.

A flexible bulb 110 that is located inside a flexible container 200 in accordance with various embodiments is depicted in FIG. 20. The flexible bulb 110 can be of any shape. For instance it can be of a cubic, cylindrical, spherical, etc. shape, and it may be flexible enough to deform at low pressure for instance when the container is squeezed by one hand or fingers. To achieve or further enhance flexibility, the bulb 110 may be made of thin plastics/polymers such as variations of polyethylene (e.g., LDPE, LLDPE, HDPE, etc.), silicon, rubber synthetic rubber, nitrile and etc., and optionally of a thickness of approximately 0.1 to 1 mm. In some cases, the bulb 110 may feature an integrated surface geometry or internal structure to assist the bulb 110 in reverting back to its original shape. Exemplary geometries, shapes, and structures can be seen in FIGS. 14-19. Inclusion or use of ridges, compression zones, or other spring elements, such as optionally axillary springs or spring-like features 111, may facilitate or otherwise improve bulb deformation or flexibility during use.

When the dispenser assembly 100 is disposed within a bottle or other container 200, prior to the first dispensing, optionally with the container substantially upside-down, hand pressure on the container 200 primes the device by compressing the bulb 110. This pressure also closes $FV_{in}$ 130 thus preventing the liquid entering the dosing device. When the pressure is removed, the bulb 110 reverts back to its original shape therefore refilling the dosing device 100 due to the pressure difference in the bulb 110 and surrounding volume of container 200. Now, the device is primed and ready to dispense. After this, the squeeze of the bottle or container 200 pressurizes the dosing device 100 and opens $FV_{ex}$ thus allowing for repeated dispensing of the precise amount of required liquid.

The invention claimed is:

1. A fluid dispensing device comprising:
a compressible body for placement within a container, wherein the compressible body compresses responsive to applying compression to the container; and
a substantially hollow fluid traversal body coupled to said compressible body, said fluid traversal body comprising at least one inlet aperture having an inlet valve associated therewith configured to be closed when said compressible body is under compression and to be open when said compressible body is not under compression, said fluid traversal body comprising at least one outlet aperture located outside of the container having an outlet valve associated therewith configured to be open when said compressible body is under compression and to be closed when said compression body is not under compression.

2. The fluid dispensing device of claim 1 wherein said inlet valve comprises an inlet membrane surrounding the substantially hollow fluid traversal body disposed over said at least one inlet aperture.

3. The fluid dispensing device of claim 1 wherein said outlet valve comprises an outlet membrane surrounding the substantially hollow fluid traversal body disposed over said at least one outlet aperture.

4. The fluid dispensing device of claim 1 wherein closing of the inlet valve prevents fluid from flowing into said fluid traversal body and opening the inlet valve enables fluid to flow into said fluid traversal body.

5. The fluid dispensing device of claim 1 wherein closing of the outlet valve prevents fluid from flowing into said fluid traversal body and opening the outlet valve enables fluid to flow into said fluid traversal body.

6. The fluid dispensing device of claim 1 wherein said compressible body is composed of a plastic or polymer.

7. The fluid dispensing device of claim 6 wherein said compressible body includes a compression feature.

8. The fluid dispensing device of claim 7 wherein said compression feature is at least one ridge disposed along an exterior surface of said compressible body.

9. The fluid dispensing device of claim 6 wherein said plastic or polymer is a polyethylene material.

10. A fluid dispensing device comprising:
a container configured for housing a fluid;
a compressible body disposed within the container for dispensing fluid, wherein the compressible body compresses by applying compression to the container;
a substantially hollow fluid traversal body coupled to the compressible body, the fluid traversal body comprising at least one inlet aperture configured to be closed when said compressible body is under compression, said fluid traversal body comprising at least one outlet aperture configured to be open when said compressible body is under compression;
an inlet membrane surrounding the substantially hollow fluid traversal body and disposed over said at least one inlet aperture that acts as an inlet valve; and
an outlet membrane surrounding the substantially hollow fluid traversal body and disposed over said at least one outlet aperture that acts as an outlet valve.

11. The fluid dispensing device of claim 10 wherein closing of the inlet valve prevents fluid from flowing into said fluid traversal body and opening the inlet valve enables fluid to flow into said fluid traversal body.

12. The fluid dispensing device of claim 10 wherein closing of the outlet valve prevents fluid from flowing into said fluid traversal body and opening the outlet valve enables fluid to flow into said fluid traversal body.

13. The fluid dispensing device of claim 10 wherein said compressible body is composed of a plastic or polymer.

14. The fluid dispensing device of claim 10 wherein said compressible body includes a compression feature.

* * * * *